United States Patent [19]
Beggs et al.

[11] Patent Number: 6,017,968
[45] Date of Patent: Jan. 25, 2000

[54] SHEAR THINNABLE ORGANIC COMPOSITIONS THICKENED WITH ALUMINA

[75] Inventors: Ronald L. Beggs, Leander; J. Scott Leigh, Cedar Park; Jeff T. Fenton, Katy, all of Tex.

[73] Assignee: CONDEA Vista Company, Houston, Tex.

[21] Appl. No.: 08/389,554

[22] Filed: Feb. 15, 1995

Related U.S. Application Data

[63] Continuation of application No. 08/011,164, Jan. 29, 1993, abandoned.

[51] Int. Cl.[7] .................................. C08J 3/02; C09D 9/00
[52] U.S. Cl. .......................... 516/112; 516/100; 516/34; 510/203; 252/70
[58] Field of Search ...................... 252/308, 309, 252/315.7, 70, 170, DIG. 8; 516/100, 112, 34; 510/203

[56] References Cited

U.S. PATENT DOCUMENTS

| | | | |
|---|---|---|---|
| 1,208,265 | 12/1916 | Baskerville | 44/266 |
| 3,963,832 | 6/1976 | Hashimoto et al. | 424/56 |
| 3,981,826 | 9/1976 | Munro | 516/34 |
| 4,666,614 | 5/1987 | Block | 516/112 |
| 4,676,928 | 6/1987 | Leach et al. | 516/93 |
| 4,780,235 | 10/1988 | Jackson | 510/212 |
| 4,812,255 | 3/1989 | Suwala | 510/203 |
| 4,950,416 | 8/1990 | Baxter | 510/221 |
| 5,011,621 | 4/1991 | Sullivan | 252/364 |
| 5,015,410 | 5/1991 | Sullivan | 510/208 |
| 5,035,829 | 7/1991 | Suwala | 510/202 |
| 5,106,525 | 4/1992 | Sullivan | 510/202 |
| 5,215,675 | 6/1993 | Wilkins et al. | 570/206 |

*Primary Examiner*—Richard D. Lovering
*Assistant Examiner*—Daniel S. Metzmaier
*Attorney, Agent, or Firm*—Browning Bushman

[57] ABSTRACT

A thickened, shear thinnable composition comprising a water-miscible organic liquid, alumina, water and an effective amount of a gelling agent that will flocculate or gel the alumina to the desired degree but permit the gelled composition to be rendered less viscous or pourable upon the application of a shear force.

8 Claims, No Drawings

SHEAR THINNABLE ORGANIC COMPOSITIONS THICKENED WITH ALUMINA

This is a continuation of U.S. application Ser. No. 08/011,164, filed on Jan. 29, 1993 now abandoned.

BACKGROUND OF THE INVENTION

1. Field of the Invention

The present invention relates to thickened or viscosified organic compositions. More particularly, the present invention relates to shear thinnable, thickened compositions containing water-miscible, organic liquid compounds.

2. Description of the Prior Art

Thickened or viscous compositions containing water-miscible organic liquids have found use in a wide variety of applications. For example, such thickened compositions can be used as coating removers to remove paint, varnish and similar coatings from surfaces; graffiti removers; deicers for use on aircraft; etc. Typically, these thickened organic liquid-containing compositions contain the desired, water-miscible (soluble) organic liquid and a thickening additive that imparts the desired rheological properties to the composition. For example, in the case of coating removers, e.g., paint removers, it is desirable that the compositions exhibit sufficient viscosity so as to adhere to inclined, e.g., vertical surfaces. In the deicing of aircraft, it is particularly important that the composition exhibit sufficient viscosity to adhere to the inclined surfaces of the wings until removed by wind shear lest the air foil surfaces not be properly deiced.

A desirable property of thickened compositions containing water-miscible organic liquids is that of thixotropic or shear thinning behavior. Such formulations revert from highly viscous gels in the quiescent state to readily pourable or fluid compositions upon the application of a moderate shearing force such as manual shaking, moderate stirring or the like. This shear thinning characteristic makes it possible to readily incorporate the composition into formulations that can be sprayed or similarly applied.

SUMMARY OF THE INVENTION

It is therefore an object of the present invention to provide a thickened organic composition.

Another object of the present invention is to provide a thickened organic composition comprising a water-miscible, organic liquid.

Still a further object of the present invention is to provide a shear thinnable, thickened composition containing a water-miscible organic liquid.

The above and other objects of the present invention will become apparent from the claims and the description given herein.

The present invention provides a thickened organic composition that is thixotropic or shear thinnable comprising a water-miscible, organic liquid; alumina, preferably in the form of an aqueous dispersion; water, including the water in the aqueous dispersion; and a gelling agent that acts to flocculate or gel the alumina but that permits the composition to undergo thinning, i.e., exhibit reduced viscosity, upon the application of a shearing force.

DESCRIPTION OF THE PREFERRED EMBODIMENT

The compositions of the present invention contain four main components, namely, a water-miscible, organic liquid; alumina; a gelling agent; and water.

The organic liquid useful in the composition of the present invention can virtually comprise any organic liquid (or mixture thereof) that is soluble or miscible in water. While the organic liquid need not be totally miscible, in all proportions, with water, it should exhibit sufficient miscibility so as to be generally considered "water-soluble." Preferably, the organic liquid will have a solubility or miscibility to the extent that it is soluble or miscible in water in an amount of at least about 30% by weight. Non-limiting examples of suitable organic liquids that can be employed include water-soluble or -miscible mono- or polyhydroxy organic compounds such as aliphatic and aromatic alcohols, particularly aliphatic alcohols containing from about 1 to about 4 carbon atoms; glycols; glycol ethers; carbonates; nitrogen-containing compounds such as lactams, amides and amines; ketones; esters, etc. Specific examples of suitable organic liquids include but are not limited to methanol, ethanol, isopropanol, n-butanol, propylene glycol, ethylene glycol, propylene glycol monomethyl ether, propylene glycol t-butyl ether, dipropylene glycol monomethyl ether, propylene carbonate, ethylene carbonate, N-methyl-2-pyrrolidone, methyl formate, ethyl acetate, dioctyl phthalate, acetone and the like, as well as mixture of any or all of the above. It will be understood that, in most cases, the organic liquid or mixture thereof will be chosen on the basis of the organic liquid serving as an active component for the intended end use of the composition. For example, in the case of a paint (coating) remover composition, N-methyl-2-pyrrolidone would be chosen since it is known to cause lifting of paint and other coatings from painted or coated surfaces. Clearly, in the case of a deicer wherein glycols are commonly employed, the organic liquid serves as the active component in the intended use of the composition. There are cases where the organic liquid serves solely as a carrier, the active component being another compound (or mixture thereof) that is incorporated into the composition. For example, the composition could be used as a mildew remover, the organic liquid serving primarily as a carrier for a small but effective amount of an algicide. The organic liquid, which as noted above can include a mixture of water-miscible organic liquids, will generally be present in the composition in an amount of from about 30 to about 85% by weight, preferably in an amount of from about 40 to about 80% by weight.

The alumina used as the thickening agent in the compositions of the present invention can comprise any hydrated alumina that will function as a thixotrope in the composition. Although alumina powder can be used, generally the alumina will be used in the form of slurries or dispersions of alumina, particularly boehmite alumina, in an aqueous medium, particularly deionized water. Such aqueous dispersions or slurries can be formed by methods such as disclosed in U.S. Pat. Nos. 4,746,503 or 4,676,928, both of which are incorporated herein by reference for all purposes. Generally speaking, the alumina dispersion will contain from about 1 to about 30% by weight alumina depending upon the method of forming the dispersion, the particular type of alumina employed and the desired viscosity of the alumina dispersion. Where the alumina is incorporated into the composition by way of a dispersion, the dispersion (containing 1–30% by weight alumina) will generally be present in the composition in an amount of from about 10 to about 70% by weight. In general, the alumina, as $Al_2O_3$, will be present in the composition in an amount sufficient to act as thixotrope, i.e., impart the desired degree of viscosity or gel formation to the composition. Depending upon the amount and type of organic liquid and other components present, the amount of alumina, as $Al_2O_3$, can vary widely. In general, however, the amount of alumina, as $Al_2O_3$, will range from about 0.5 to about 25% by weight.

The third major component of the composition of the present invention is a gelling agent. The gelling agent, which may be considered a flocculent, can be any compound or substance that will act to flocculate or gel the alumina and hence, the composition. The gelling agent must have the property of causing gelling or flocculation of the alumina sufficient to viscosify the composition. Additionally, the gelling agent must be of a type that permits the composition to exhibit reduced viscosity upon the application of a shear force. Numerous such gelling agents can be employed, the only requisite being that the gelling agent be water-soluble to the extent that will dissolve in the amount of water present in the composition. Generally speaking, virtually any ionic compound can be employed as a gelling agent. Non-limiting examples of suitable gelling agents include mineral acids and certain water-soluble organic acids; salts of monovalent acids and certain water-soluble organic acids; certain amine-type compounds; ammonium hydroxide; etc. Specific examples of gelling agents include but are not limited to aluminum nitrate, aluminum chloride, ferric nitrate, ferric chloride, magnesium nitrate, sodium chloride, magnesium acetate, ammonium hydroxide, etc. It will be appreciated that one or more gelling agents may be employed as desired or necessary to achieve the desired rheological properties of the compositions. The gelling agent will be present in an effective amount, i.e., an amount that imparts the desired degree of gelling but that permits the composition to become free-flowing (exhibit reduced viscosity) upon the application of a shearing force. In general, the gelling agent will be present in an amount of from about 0.001 to about 10%, preferably from about 0.005 to about 5% by weight of the composition.

The composition of the present invention also requires the presence of water. Water, including any water in the alumina dispersion and/or gelling agent, will be present in an amount of at least about 10% by weight, generally from about 10 to about 90% by weight, preferably from about 15 to about 70% by weight.

Generally speaking, the compositions of the present invention shear thin upon the application of a shearing force that can be imparted, for example, by vigorous shaking or stirring by hand. Indeed, it is a feature of the composition of the present invention that the compositions will remain as a stable gel when in the quiescent stage but will revert to an easily flowable or pourable fluid state if it is shaken vigorously by hand. Thus, the compositions are ideally suited for use in aerosol dispensers and other types of spraying operations that enable the composition to be efficiently and evenly distributed over a surface, the composition gelling or resisting flow once it has been applied to the surface and left in the quiescent condition but rapidly converting to a free-flowing composition when only moderate shear, e.g., shaking by hand, is employed. Thus, the shear force should be that amount of shear sufficient to convert the composition from a stable gel in the quiescent state to a flowable medium upon the application of the shear force.

The pH of the composition can vary widely. As evidenced by the fact that the gelling agent can comprise either acidic or basic materials, the pH is not generally a consideration unless it is desired, for end purpose uses of the composition, to have the pH at a desired level.

As noted above, depending upon the end use to which the compositions are put, other additives may be incorporated. For example, if the composition is used in a paint or coating remover formulation, the compositions can advantageously contain surfactants for ease in water clean-up of the surfaces from which the coating has been removed. Additionally, in such paint or coating removal application, it is common to employ corrosion inhibitors to retard corrosion of the surfaces from which the paint or coating has been removed. In cases where the composition is to be employed as a graffiti remover, it may be desirable to incorporate abrasives such as calcium carbonate, corundum or other such materials that can serve as abrasives to aid in removing the graffiti.

One of the desirable features of the composition of the present invention is that the thickener, being alumina, is relatively inert and environmentally safe. This is particularly advantageous in cases where the compositions are used in applications such as deicers, graffiti removers, etc., where relatively large quantities of the composition may be washed into storm sewers or, in the case of deicers, dispersed into the air and eventually onto the ground.

To more fully illustrate the present invention, the following non-limiting examples are presented.

EXAMPLE 1

A composition comprised of 79.0% by weight ethanol, 20.8% by weight aqueous dispersion of boehmite alumina (20% by weight $Al_2O_3$) and 0.2% by weight ammonium hydroxide (1.5% by weight aqueous solution) was prepared by adding the components in the order mentioned above. After each addition of a component, the composition was mixed 1–2 minutes with a high shear mixer (Ross Model 100-L). The pH of the composition was 6.1 and became a "gel" upon cessation of shear. After 13 weeks, the composition was still found to be physically stable, i.e., there was no noticeable (syneresis) phase separation or settling. Viscosity of the composition was measured using a Bohlin VOR rheometer with a cone/plate measuring system. Rheological results after preparation are shown below:

| Shear Rate ($sec^{-1}$) | Viscosity (cP) |
| --- | --- |
| 1.5 | 17,490 |
| 5.8 | 3,644 |
| 23.3 | 862 |
| 92.5 | 223 |

The composition of this example could be used as a graffiti remover, deicer, etc.

EXAMPLE 2

A deicer composition using an ethylene glycol-based antifreeze distributed by Industrial Lubricants Co. and having the following composition was prepared:

| | Wt % |
| --- | --- |
| "Antifreeze" | 48.1 |
| Boehmite alumina dispersion (20% $Al_2O_3$) | 12.0 |
| Water | 38.5 |
| Magnesium nitrate ($Mg(NO_3)_2.6H_2O$) | 0.7 |
| Aluminum nitrate ($Al(NO_3)_3.9H_2O$) | 0.7 |

The components were added in the order shown and hand mixed with a spatula for 1–2 minutes. The mixture was then sonicated (Heat Systems-Ultrasonics, Inc., Model W-385) for 1–2 minutes. The formulation pH was 6.0. The formulation was found to be stable 11 weeks after preparation.

Viscosity measurements were made after preparation as per the procedure of Example 1 with the following results:

| Shear Rate (sec$^{-1}$) | Viscosity (cP) |
| --- | --- |
| 1.5 | 2,891 |
| 5.8 | 624 |
| 23.3 | 163 |
| 92.5 | 49.6 |

This composition, when used as a deicer, would remain as a stable gel on the aircraft wings, thereby ensuring complete deicing of the air foil surfaces. However, when the plane began its take-off run, the wind shear would fluidize the composition so that it would flow off the wings, thereby obviating excess weight or interference with the air foil surfaces.

EXAMPLE 3

A thickened propylene glycol composition having the following formulation was prepared as per the procedure of Example 2:

| | Wt % |
| --- | --- |
| Propylene glycol | 47.7 |
| Boehmite alumina dispersion (20% Al$_2$O$_3$) | 11.9 |
| Magnesium nitrate (Mg(NO$_3$)$_2$.6H$_2$O) | 0.7 |
| Aluminum nitrate (Al(NO$_3$)$_3$.9H$_2$O) | 0.7 |
| Water | 38.2 |
| Sodium hydroxide (50%) | 0.8 |

Brookfield viscosity measurements using a #4 spindle are as follows:

| RPM | Viscosity (cP) |
| --- | --- |
| 0.3 | 3,333 |
| 0.6 | 2,000 |
| 6.0 | 1,200 |
| 12.0 | 550 |

EXAMPLE 4

A thickened propylene glycol composition was prepared by mixing the following components in the order and amount shown at high shear for 5–6 minutes:

| | Wt % |
| --- | --- |
| Boehmite alumina dispersion (5.9% Al$_2$O$_3$) | 44.7 |
| Propylene glycol | 54.6 |
| Ammonium hydroxide (1.5%) | 0.7 |

The pH of the composition was 7.3. Brookfield viscosity measurements using a #4 spindle are given below:

| RPM | Viscosity (cP) |
| --- | --- |
| 10.0 | 4,100 |
| 20.0 | 2,300 |
| 60.0 | 970 |
| 100.0 | 660 |

EXAMPLE 5

The following thickened propylene glycol composition was prepared:

| | Wt % |
| --- | --- |
| Water | 35.0 |
| Nitric acid (0.3 Normal) | 5.4 |
| Boehmite alumina powder (71.4% Al$_2$O$_3$) | 3.5 |
| Propylene glycol | 53.8 |
| Sodium chloride | 2.2 |

The first three listed components were mixed together under high shear (Ross Mixer Model 100-L) for 10 minutes. The final two components were added in the order shown, and the composition was mixed another 5 minutes to completion. The composition had a pH of 3.3. The composition was found to be extremely thixotropic. Brookfield viscosity measurements using a #4 spindle are as follows:

| RPM | Viscosity (cP) |
| --- | --- |
| 10.0 | 18,200 |
| 20.0 | 10,600 |
| 60.0 | 4,100 |
| 100.0 | 2,700 |

As can be seen by comparing the composition of Example 5 with the composition of Example 4, dramatic differences in the viscosity of the compositions can be made by varying the alumina content and the type and amount of gelling agent.

EXAMPLE 6

The following composition, useful as a graffiti remover, was prepared:

| | Wt % |
| --- | --- |
| Diethylene glycol monomethyl ether | 53.5 |
| Water | 30.1 |
| Boehmite alumina dispersion (20% Al$_2$O$_3$) | 13.4 |
| Magnesium nitrate (MgNO$_3$ 6H$_2$O) | 0.7 |
| Aluminum nitrate (Al(NO$_3$)$_3$ 9H$_2$O) | 0.7 |
| Sodium hydroxide (50%) | 1.6 |

The components were added in the order listed above and mixed with moderate agitation for 5 minutes and then with high shear for 2–3 minutes. The formulation pH was 13. Brookfield viscosity measurements using a #4 spindle are as follows:

| RPM | Viscosity (cP) |
| --- | --- |
| 10.0 | 5,780 |
| 20.0 | 3,150 |
| 60.0 | 1,260 |
| 100.0 | 864 |

EXAMPLE 7

The following composition, useful as a paint or other coating remover, was prepared:

|  | Wt % |
| --- | --- |
| Water | 35.8 |
| Boehmite (water dispersible type) alumina (71.4% $Al_2O_3$) | 3.5 |
| Propylene glycol tertiary-butyl ether | 36.0 |
| N-methyl-2-pyrrolidone | 24.0 |
| Sodium chloride | 0.7 |

In preparing this composition, the alumina was slowly added to water and mixed with moderate agitation for 20 minutes to form a dispersion. The remaining ingredients were then added in the order listed and mixed using high shear for 2–3 minutes. The pH of the composition was 5.7. Brookfield viscosity measurements using a #4 spindle are as follows:

| RPM | Viscosity (cP) |
| --- | --- |
| 10 | 10,200 |
| 20 | 5,000 |
| 50 | 2,364 |
| 100 | 1,420 |

EXAMPLE 8

The following composition, useful as a paint or other coating remover, was prepared as per the procedure of Example 7:

|  | Wt % |
| --- | --- |
| Water | 35.7 |
| Boehmite (water dispersible type) alumina (71.4% $Al_2O_3$) | 3.5 |
| Propylene glycol tertiary-butyl ether | 35.8 |
| N-methyl-2-pyrrolidone | 23.9 |
| Ammonium hydroxide (1.5%) | 1.1 |

The pH of the composition was 8.5. Brookfield viscosity measurements using a #4 spindle are as follows:

| RPM | Viscosity (cP) |
| --- | --- |
| 10 | 5,720 |
| 20 | 2,940 |
| 50 | 1,284 |
| 100 | 704 |

EXAMPLE 9

The following composition, useful as a paint remover, was prepared:

|  | Wt % |
| --- | --- |
| Water | 14.6 |
| Nitric acid solution (0.3 Normal) | 5.0 |
| Boehmite alumina (71.4% $Al_2O_3$) | 3.5 |
| Propylene glycol tertiary-butyl ether | 45.0 |
| N-methyl-2-pyrrolidone | 30.0 |
| Sodium chloride | 0.8 |
| Ammonium hydroxide (1.5%) | 1.1 |

In preparing the composition, the nitric acid was added to water following which the alumina was slowly added mixed with moderate agitation for 20 minutes to form a dispersion. The remaining components were added in the order listed and mixed using high shear for 2–3 minutes. The composition had a pH of 7.3. Brookfield viscosity measurements using a #4 spindle were as follows:

| RPM | Viscosity (cP) |
| --- | --- |
| 10 | 4,980 |
| 20 | 2,640 |
| 50 | 1,160 |
| 100 | 640 |

EXAMPLE 10

The following propylene-glycol-containing composition was prepared:

|  | Wt % |
| --- | --- |
| Water | 35.0 |
| Nitric acid solution (0.3 Normal) | 5.4 |
| Boehmite alumina (71.4% $Al_2O_3$) | 3.6 |
| Propylene glycol | 53.8 |
| Sodium chloride | 2.2 |

In preparing the composition, the nitric acid was added to water. Alumina was slowly added and mixed with high shear for 10 minutes to form a dispersion. Continuing to use high shear, the propylene glycol was added and mixed for about 1 minute, followed by the addition of the sodium chloride after which mixing was continued for 5 minutes to completion. The composition had a pH of 3.3. Brookfield viscosity measurements using a #4 spindle are as follows:

| RPM | Viscosity (cP) |
| --- | --- |
| 10 | 18,200 |
| 20 | 10,600 |
| 60 | 4,100 |
| 100 | 2,700 |

The foregoing description and examples illustrate selected embodiments of the present invention. In light thereof, variations and modifications will be suggested to one skilled in the art, all of which are in the spirit and purview of this invention.

What is claimed is:

1. A shear thinnable, thickened composition comprising:
    from about 30 to about 85% by weight of a water-miscible, organic liquid;
    from about 0.5 to about 25% by weight of a hydrated alumina, calculated as $Al_2O_3$, said alumina being of a type that will function as a thixotrope in said composition;
    from about 15 to about 70% by weight water; and
    from about 0.005 to about 5% by weight of a water-soluble gelling agent, said gelling agent being dissolved in said composition and of a type that induces flocculation or gelling of said alumina to form a thickened composition, said composition being a stable gel when in the quiescent stage but becoming free-flowing on the application of a moderate shearing force.

2. The composition of claim 1 wherein said alumina is added as an aqueous dispersion.

3. The composition of claim 2 wherein said alumina is present in said aqueous dispersion and said aqueous dispersion is present in said composition in an amount of from about 10 to about 70% by weight.

4. The composition of claim 1 wherein said hydrated alumina comprises boehmite.

5. The composition of claim 1 wherein said gelling agent comprises an ionic compound.

6. The composition of claim 1 wherein said water-miscible, organic liquid comprises a monohydroxy organic compound.

7. The composition of claim 1 wherein said water-miscible, organic liquid comprises a polyhydroxy organic compound.

8. The composition of claim 1 wherein said water-miscible, organic liquid comprises a lactam.

* * * * *